United States Patent [19]
Reeves et al.

[11] Patent Number: 5,320,375
[45] Date of Patent: Jun. 14, 1994

[54] INTERRUPTIBLE SHOCK ABSORBER SUSPENSION FOR BICYCLES

[76] Inventors: Edmund Reeves, 2939 Miller Way, Placerville, Calif. 95667; David Shirley, 10854 Tabeau Rd., Pine Grove, Calif. 95665

[21] Appl. No.: 892,355

[22] Filed: Jun. 2, 1992

[51] Int. Cl.5 .............................................. B62K 25/28
[52] U.S. Cl. ...................................... 280/284; 280/275; 188/319
[58] Field of Search .................... 280/284, 285, 281.1, 280/275, 274; 188/319, 322.13, 322.15

[56] References Cited

U.S. PATENT DOCUMENTS

| | | | |
|---|---|---|---|
| 1,205,433 | 11/1916 | Christman | 188/319 |
| 1,273,011 | 7/1918 | Snyder | 188/319 |
| 3,063,518 | 11/1962 | Stark | 188/319 |
| 4,582,343 | 4/1986 | Waugh | 280/284 |
| 4,679,811 | 7/1987 | Shuler | 280/284 |
| 4,800,995 | 1/1989 | Bernhardt et al. | 188/319 |
| 4,953,671 | 9/1990 | Imaizumi | 188/319 |
| 4,993,523 | 2/1991 | Schwemmer et al. | 188/319 |
| 5,098,114 | 3/1992 | Jones | 280/284 |
| 5,154,263 | 10/1992 | Lizell | 188/319 |

*Primary Examiner*—Margaret A. Focarino
*Assistant Examiner*—Kevin Hurley
*Attorney, Agent, or Firm*—Louis J. Bachand

[57] ABSTRACT

Mountain bicycle suspension having a shock absorber whose function can be selectively disabled by blocking normal compression and extension response to optimize suspension characteristics for different riding conditions, e.g. rigid suspension for efficient use of energy during hard acceleration and hill climbing, and soft suspension for control on downhill runs and cruising under smooth terrain conditions.

26 Claims, 3 Drawing Sheets

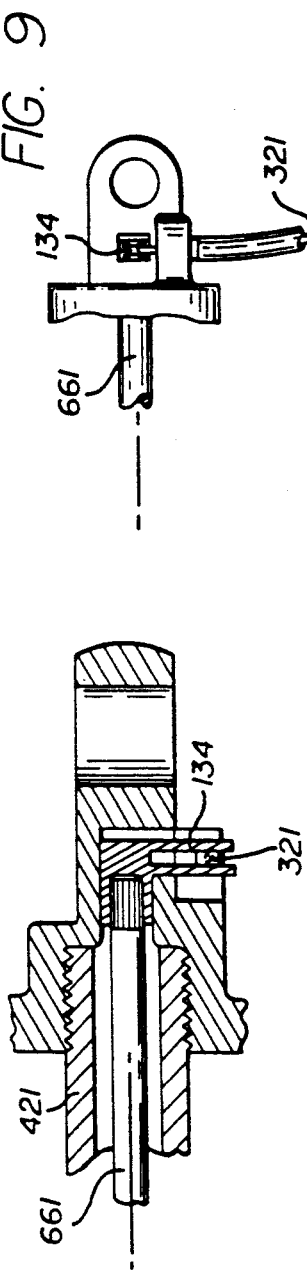
FIG. 8
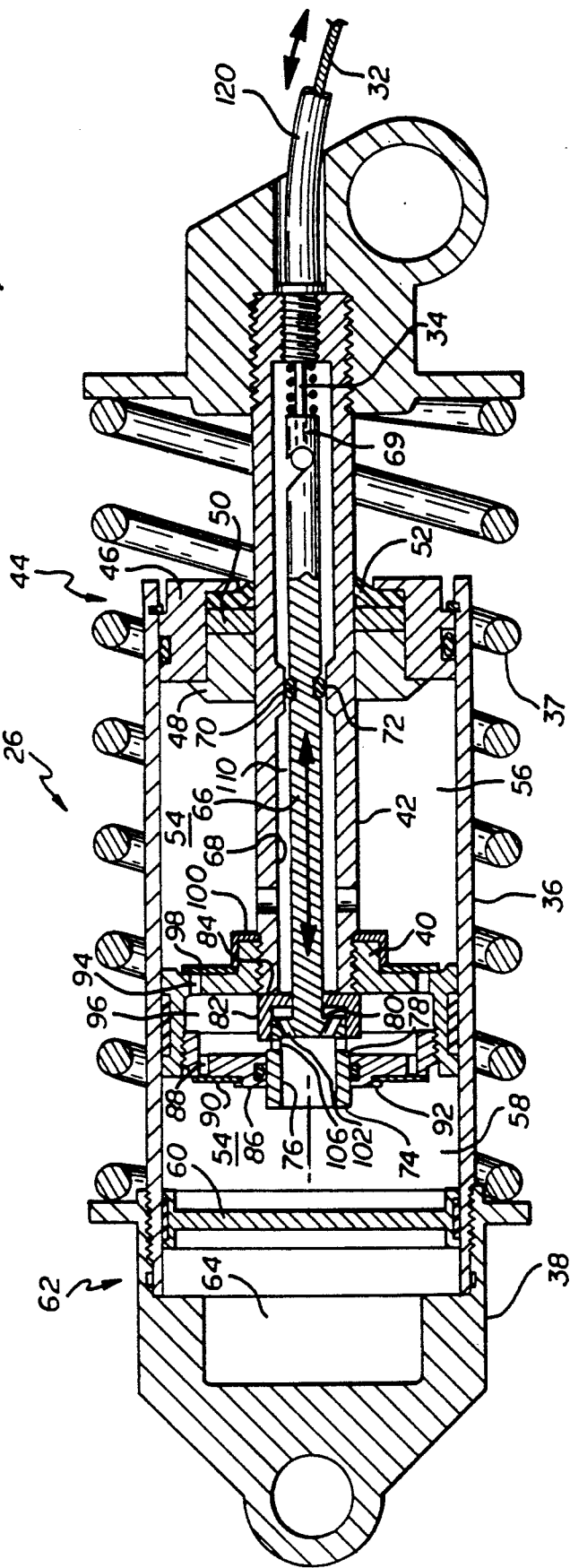
FIG. 9
FIG. 2

INTERRUPTIBLE SHOCK ABSORBER SUSPENSION FOR BICYCLES

TECHNICAL FIELD

This invention has to do with mountain bicycles and, more particularly, with suspensions for the rear wheels of mountain bicycles. In a particular aspect, the invention is concerned with novel shock absorbers for mountain bicycle rear wheel suspensions.

BACKGROUND

Bicycles are human powered two-wheeled vehicles having a frame mounted on the wheels, a drive sprocket and chain, pedals and crank for driving the drive sprocket, handlebars, and a seat mounted on a seat post. In recent years there has been a substantial upsurge in the vigorous recreational use of bicycles, and a new type of bicycle frequently termed a mountain bike has been developed for use in climbing and descending rough and steep terrain. In addition to sturdier construction, mountain bicycles often have complicated gearing affording numerous drive ratios, and improved brakes, wheels and wheel suspensions.

Rear wheel suspensions have been improved by the addition of such suspension components as shock-absorber controlled swing arms in place of the rigid bars which are typically found on bicycles.

SUMMARY OF THE INVENTION

The addition of shock absorbers and swing arms to bicycles has been beneficial in rough terrain and on smooth surfaces where better control and greater comfort are experienced. In situations where acceleration or other maximum effort by the rider is required, e.g. hill climbing, it has been found that the suspension detracts from performance as the suspension reacts to the force of the rider's efforts and absorbs energy desirably put into driving the rear wheel.

It is an object of the invention to improve rear wheel suspensions of bicycles, particularly mountain bicycles. It is another object to provide bicycles which have variable suspension characteristics, so that ride can be optimized relative to the varying types of terrain encountered. It is a specific object to provide a shock absorber equipped bicycle suspension which can be readily blocked when terrain and other riding conditions dictate and readily unblocked when the full suspension benefit is desired. It is yet another object to provide an improved shock absorber which enables control of the suspension action as mentioned. Still another object is modification of known shock absorbers to selectively limit their normal response to forces applied. It is a particular object to provide means within a hydraulic shock absorber to block the flow of fluid normally incident to compression and extension of the shock absorber thereby to lock the shock absorber at a predetermined length, prevent the usual response of the suspension to sensed force, and maximize energy input to the bicycle rear wheel when desired. Other objects will appear hereinafter.

The invention provides to bicycle suspensions an ability to change the suspension response characteristic, e.g. from the handlebars, so that the suspension can be matched to the terrain and rider's needs to maximize efficiency and performance. Essentially this character changing ability is obtained by selectively blocking the shock absorber function. The suspension structure remains the same, only the operation of the shock absorber is changed, but this change interrupts the usual response of the suspension to encountered force. When a rider pedals hard, as during acceleration, or up a steep hill, the suspension tends to respond as though a substantial force was being applied to the wheel, as the bicycle frame receives the force of the downward power stroke of the rider's leg. A portion of the rider's energy is dissipated in the shock absorber as it reacts to the force. This energy is not recovered and is lost to the purpose of the rider, e.g. to go faster or farther. By interrupting the operation of the suspension, by blocking the suspension response to encountered forces, the rider's energy is input, without dissipation by the suspension, into driving the rear wheel. The invention uses a locking of the suspension via the shock absorber to accomplish this result. Thus the invention result is achieved with little alteration of the suspension per se, and by a means which is readily controllable by the rider during riding.

The preceding objectives are realized in a suspension for a human-powered bicycle comprising a rear wheel-carrying swing arm and a shock absorber means acting thereon, which includes means selectively blocking normal extension and compression response of the shock absorber to force on the rear wheel, whereby shock absorber function in the suspension is selectively interruptible.

In this and like embodiments: the shock absorber means may comprise a hydraulic shock absorber; the blocking means is internally mounted within the shock absorber; the hydraulic shock absorber includes upper and lower chambers and a piston therebetween through which fluid flows between the chambers in response to extension and compression of the shock absorber, and the internally mounted blocking means blocks extension and compression responsive fluid flow between chambers within the shock absorber to interrupt shock absorber function; the fluid flow between chambers is through port means in the piston, and including a valve normally movable to control opening and closing of the port means, the blocking means blocking movement of the valve in port means closed relation; the blocking means is bodily shiftable between port means blocking and unblocking positions; and, there is also included means external to the shock absorber for shifting the blocking means.

In another embodiment, the invention provides a suspension for a human-powered bicycle having a frame and front and rear wheels, comprising a rear wheel-carrying swing arm pivoted on the frame, a hydraulic shock absorber acting between the swing arm and the frame, the hydraulic shock absorber comprising a cylinder having upper and lower chambers and a piston therebetween having a piston rod and port means through which fluid flows between the chambers in response to extension and compression of the shock absorber by relative movement between the rear wheel and the frame, and blocking means blocking extension and compression responsive fluid flow through the port means to block shock absorber function and interrupt suspension operation.

In this and like embodiments: the piston port means include separate compression and extension ports, and there is also included separate compression and extension port valve means controlling flow through the compression and extension ports to control compression and extension characteristics of the shock absorber, the blocking means including flow control means within the shock absorber cylinder and arranged to selectively block flow through the compression and extension ports; the port means further includes an intermediate port and valve between the compression and extension ports and valves to controlling fluid flow therebetween, the intermediate port valve being bodily shiftable in fluid flow controlling relation, the blocking means acting on the intermediate port valve to prevent bodily shifting thereof, whereby fluid flow between the compression and extension ports is blocked and suspension operation interrupted; and, the piston rod includes a relatively movable element selectively in blocking relation to fluid flow between the compression and the extension ports; the piston port means include first and second ports for compression and extension respectively, and there is also included first and second port valve means to control compression and extension characteristics of the shock absorber, a third port for fluid flow between the first and second ports at least partially defined by the piston rod movable element, and third valve means selectively blocking fluid flow through the third port responsive to positioning of the piston rod movable element, Typically, the piston rod has a central bore, the rod relatively movable element being journaled in the bore for inward and outward movement with a terminal portion projecting beyond the bore, the third valve means being captured between the piston rod and the end of the movable element terminal portion for movement in third port unblocking relation when the movable element is shifted relatively outward from the bore and against movement in third port blocking relation when the movable element is shifted relatively inward toward the bore; there is further included a spring coil over the shock absorber cylinder arranged to resiliently resist shock absorber compression; and, there is further included a movable element actuating means comprising an extendible cable coupled to the movable element, and a lever arm for extending the cable in movable element extending relation.

The invention further contemplates the combination of a human powered bicycle and the foregoing suspensions.

In another embodiment, the piston rod includes a relatively rotatable element selectively in blocking relation to fluid flow between the compression and the extension ports.

In this and like embodiments: the piston port means include first and second circularly distributed ports for compression and extension respectively, and there is also included first and second circularly distributed port valve means to control compression and extension characteristics of the shock absorber, third valve means carried rotatably by the piston rod movable element for selectively blocking fluid flow between the first and second valve means the piston rod movable element; the piston rod has a central bore, the rod relatively movable element being journaled in the bore for axial rotational movement with a terminal portion projecting beyond the bore, the third valve means being carried at the end of the movable element terminal portion for arcuate movement in first and second ports blocking or unblocking relation; and, there is further included a spring coil over the shock absorber cylinder arranged to resiliently resist shock absorber compression; there is further included a movable element actuating means comprising an actuating arm adapted to drive the movable element arcuately in response to arcuate movement of the arm, an extendible cable coupled to the actuating arm to drive the arm arcuately in response to cable extension, and a lever arm for extending the cable in movable element extending relation.

The invention further contemplates the combination of a human powered bicycle and the just described suspension.

In another embodiments the invention provides a shock absorber for a human-powered bicycle suspension, the shock absorber having means selectively blocking normal extension and compression response of the shock absorber to force, whereby shock absorber function in the suspension is selectively interruptible.

In this and like embodiments, the shock absorber may be hydraulic, and the blocking means internally mounted within the shock absorber; the shock absorber includes upper and lower chambers and a piston therebetween, in which the internally mounted blocking means blocks extension and compression responsive fluid flow between chambers within the shock absorber to interrupt shock absorber function; the fluid flow between chambers is through a normally open port in the piston, the port having a valve, the piston having a rod, and in which the blocking means comprises means journaled in the piston rod and movable relative thereto to lock the port valve to the port in fluid flow blocking relation; and, there is further included means external to the shock absorber for actuating the port valve.

THE DRAWINGS

The invention will be further described in conjunction with the attached drawings in which:

FIG. 2 is a view in horizontal section of one embodiment of the invention shock absorber in the unblocked condition;

FIG. 8 is a fragmentary detail view of one form of an actuator; and,

FIG. 9 is a fragmentary detail view of a second form of an actuator.

DETAILED DESCRIPTION

Figure 1:
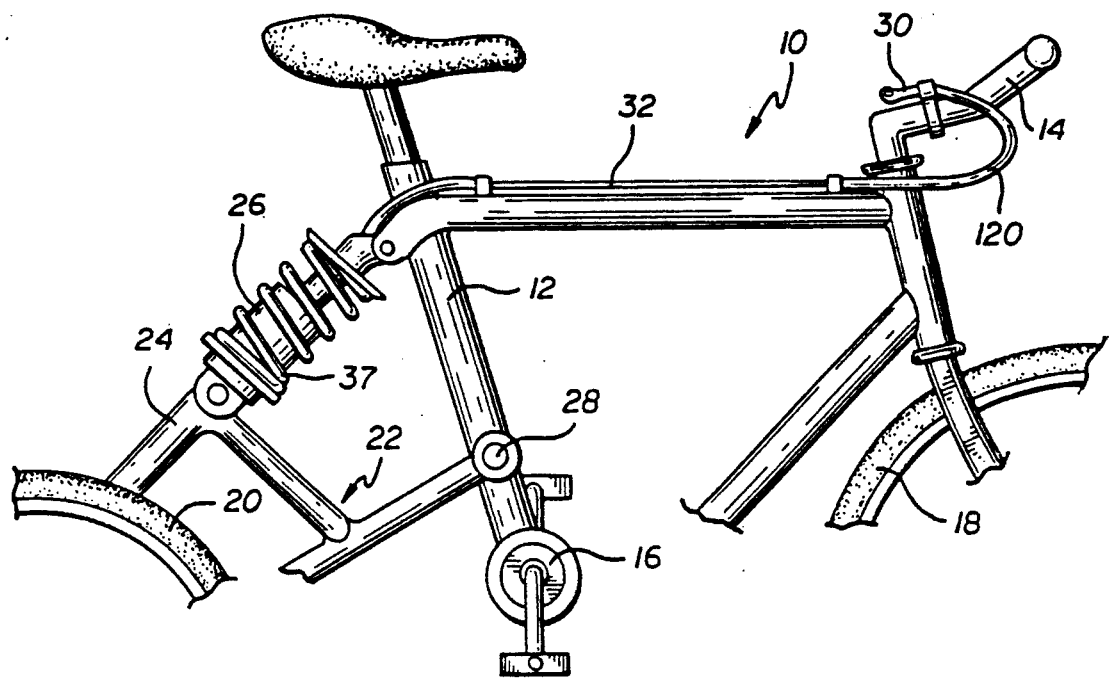
FIG. 1 is a side elevation view of a bicycle with the invention suspension installed.
Figure 3:
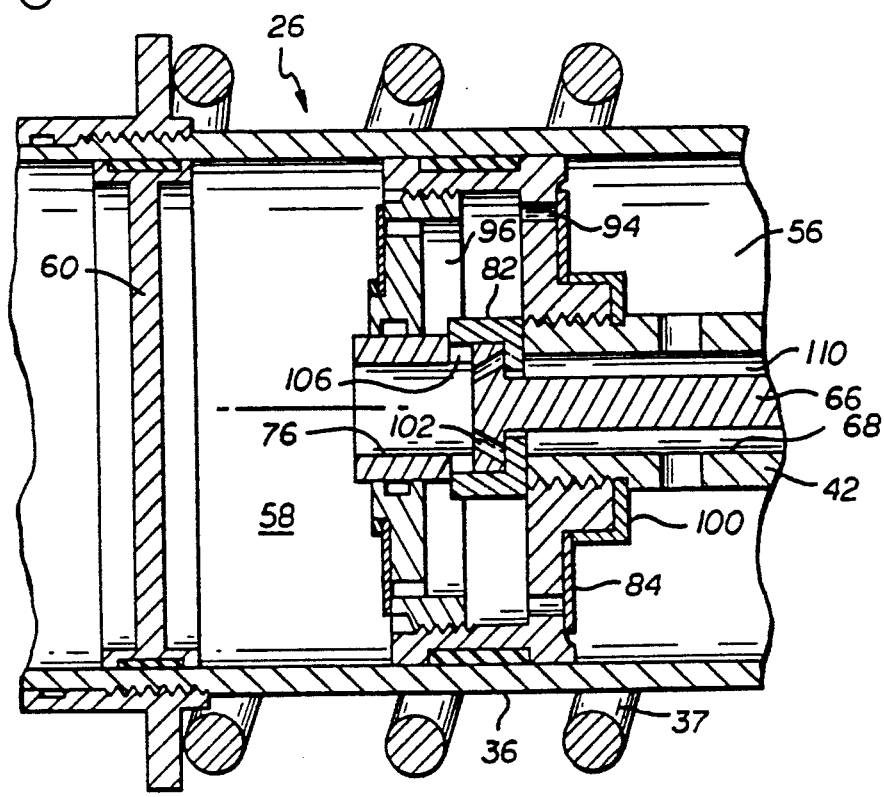
FIG. 3 is a fragmentary view like FIG. 2 showing the invention shock absorber in the blocked condition.
Figure 4:
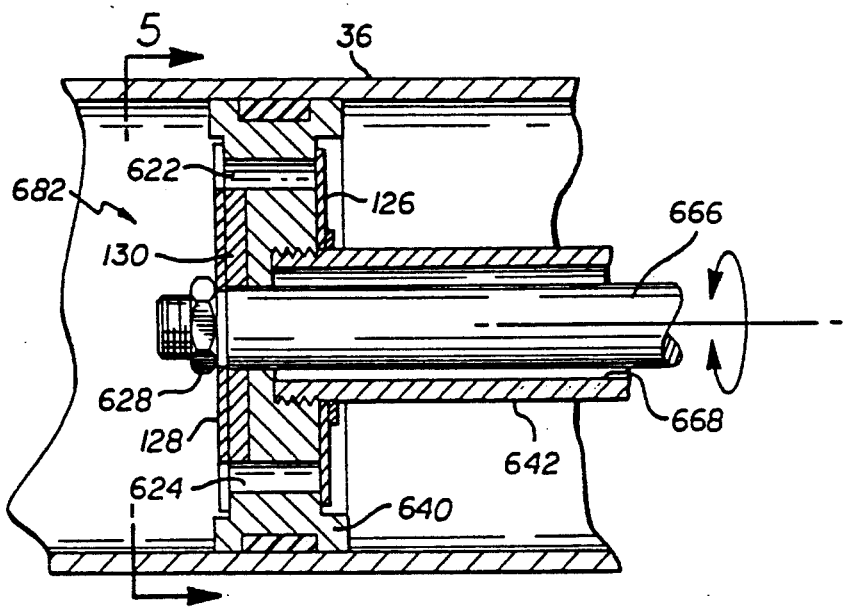
FIG. 4 is a view like FIG. 3 of another embodiment of the invention shock absorber.
Figures 5, 6:
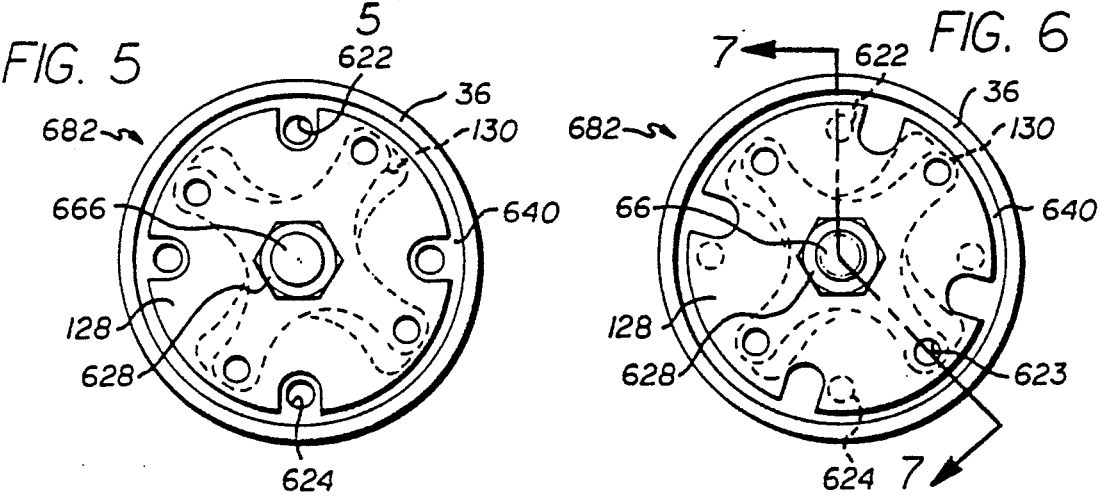
FIG. 5 is a view taken on line 5—5 in FIG. 4.
FIG. 6 is a view like FIG. 5 with the parts rotated.
Figure 7:
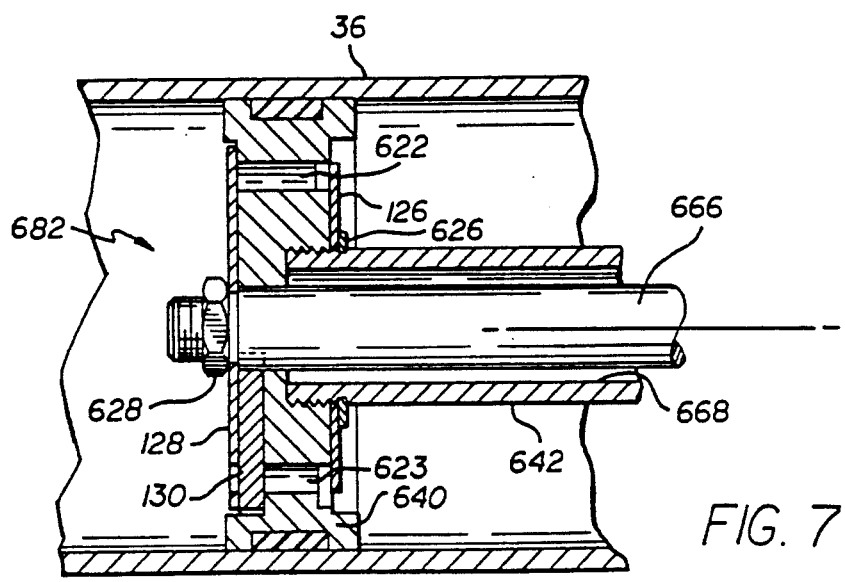
FIG. 7 is a view taken on line 7—7 in FIG. 6.

With reference to the drawings in detail, in FIG. 1 bicycle 10 is shown to comprise a frame 12, handlebar 14, sprocket and crank assembly 16, front wheel 18 and rear wheel 20, carried by a swing arm 22 the upper bar 24 of which incorporates a shock absorber 26 interposed between the swing arm and the frame, as shown. The location of the swing arm relative to the wheel 20, the ground (not shown) or the frame and point of pivoting on the frame, e.g. at 28, is not narrowly critical, with a shock absorber between the lower part of the frame and a swing arm being also suitable. What is required is that the rear wheel 20 be carried by a swing arm such as 22, and that there be a shock absorber such as 26, either a hydraulic shock as shown in FIGS. 3–5 or in another form such as a solid element having shock absorbing or elastomeric properties. A control lever 30 is mounted at the handlebar 14 conveniently for digital manipulation of the control cable 32, which is coupled to the shock absorber adjustment actuator, e.g. as shown at 34 in FIG. 2, and to be subsequently described.

The shock absorber 26 is best shown in FIG. 2 and comprises a cylindrical body 36, having a resilient coil 37 therearound in the conventional coil-over-shock arrangement, a lower endcap 38 for attachment to the swing arm 22, See FIG. 1, (or to the frame 12 if the shock absorber orientation is reversed), a piston 40 carried on piston rod 42, enclosure assembly 44 comprising gland 46, bushing 48, oil seal 50, and rod wiper 52. Piston 40 divides the interior 54 of the shock body 36 into upper and lower chambers (as shown) 56, 58 in which fluid is normally present but omitted in the drawing for clarity.

An additional, and optional, divider piston 60 is shown in the end region 62 of the lower chamber 58 to provide a volume 64 which may be filled with a gaseous fluid (not shown) to compensate for fluctuating hydraulic oil volume in the lower chamber.

Thusfar described the shock absorber and its mounting is more or less conventional, except for the provision of the control lever 30, control cable 32, and actuator 34.

With further reference to FIG. 2 and to FIG. 3 as well, the shock absorber 26 further embodies the blocking means mentioned above, as follows: A relatively movable element is provided within the piston rod 42 in the form of an internal rod 66 bodily axially slidable in axial bore 68 defined by the piston rod. The rod 66 is elongated as shown as incorporates an actuator receiving hook 69 for purposes to appear, an annular recess 70 along its length to support O-ring 72 in engagement with the piston bore 68. The internal rod 66 is stepwise radially enlarged at its lower end 74 to define an outwardly open cup 76, and radial shoulder 78 and axial shoulder 80 opposed to bore 68. Annular control valve 82 is captured on the internal rod 66 as shown between the shoulder 80 and the lower end 84 of the piston rod 42.

With reference to the piston 40 per se, fluid flow between the chambers 56, 58 is controlled in part by extension or rebound port housing 86 attached to piston 40 and having rebound port 88, spring valve 90, and spring valve retainer 92 arranged as shown to limit flow through the rebound (extension) ports in a single direction, thus to provide desired rebound characteristics for the shock absorber.

Fluid flow between chambers 56, 58 is further controlled by compression port 94 in piston 40, spaced from housing 86 across volume 96, spring valve 98, and spring valve retainer 100, as shown. Spring valve 98 limits flow through compression port 94 to one direction only and can provide dampening properties depending on valve thickness and mounting configuration.

Fluid flow between chamber 56, 58 is further and finally controlled by annular control valve 82, axial internal rod ports 102, and radial internal rod ports 106, and it is this valve the movement of which is blocked so as to lock up the shock absorber in this embodiment of the invention. With reference to FIG. 2, particularly, the annular valve 82 is lifted off ports 102 and fluid entering the cup 76 flows through ports 102 into volume 96. This direction of flow occurs when the shock absorber 26 is in a compression. In compression the piston 40 moves toward endcap 38 and high pressure hydraulic fluid (not shown) enters cup 76 and ports 102 pushing annular control valve 82 toward the piston 40. This annular valve 82 movement closes communication between volume 96 and piston rod ports 108 opening into chamber 56 from annular volume 110 defined by the piston rod 42 and the internal rod 66. The same annular valve 82 movement opens radial internal rod ports 106 and communicates cup 76 interior with volume 96. The high pressure fluid is then forced past spring valve 98 into upper chamber 56.

On a rebound stroke in which the piston 40 moves away from the endcap 38, fluid pressure builds on the gland 46 side of the piston and fluid is forced into piston rod rebound port 88. Fluid pressure in annular volume 110 shifts annular valve 82 toward the axial shoulder 80. This movement opens communication between volume 96 and volume 110 and closes radial ports 106. Fluid thus forces open extension or rebound spring valve 90 and flows through rebound port 88.

Shock absorber function is stopped by blocking the fluid from passing between chamber 56, 58. This can be accomplished with many different shock absorber configurations, but in the form shown in FIGS. 2 and 3, the annular control valve 82 movement if blocked will prevent flow between the chambers. In FIG. 2, the internal rod 66 has been shifted upwardly from its position in FIG. 1, carrying with it the annular valve 82, to the point that the valve is engaged between the lower end 84 of the piston rod 42 and the axial shoulder 80 of the internal rod 66. The inverted cup configuration of the annular valve 82 and the location of the ports 106 are such that these ports are closed as are the axial ports 102. No flow will occur between the chambers 56, 58. The shock absorber 26 now functions as a rigid element of a length dictated by the length at which the unit was locked.

Shifting of the internal rod 66 so as to lock up the annular valve 82 and block operation is readily accomplished from outside the shock absorber. With reference to FIGS. 1 and 2, control cable 32 is coupled to the hook 69 in internal rod 66. Operation of lever 30 advances or retracts the control cable within covering 120 and correspondingly shifts the internal rod 66 up or down (with reference to FIG. 1), and when shifted up the internal rod axial shoulder 80 pins the annular valve 82 to the lower end 84 of the piston rod 42.

In another embodiment, shown in FIGS. 4–9, in which like parts to the FIG. 2 embodiment have like numerals, a different internal rod 666 is provided in piston rod 642, mounted in piston axial bore 668 to rotate rather than reciprocate as in FIG. 2. The control valve 682 in the FIG. 4 embodiment comprises piston 640 having a relatively rotatable eccentric disc cutoff 130. The piston 640 of control valve 682 is provided with circularly distributed ports 622, 624 for passage of fluid in the compression or rebound mode.

Accordingly, piston 640 has both rebound ports 622, 623 and compression port 624, spring valves 126, 128, spring valve retainers 626, 628 and rebound port cutoff 130. On a compression stroke the piston 640 moves toward the endcap (38 in FIG. 2). This forces fluid through compression port 624 and past spring valve 128. Fluid cannot flow through rebound port 622 because the port is obstructed by spring valve 128. On a rebound stroke fluid flows through rebound port 622 and is forced past spring valve 126. Fluid cannot flow through compression port 624 because the port is blocked by spring valve 128. Spring valve retainer 628 holds spring valve 128 and rebound cutoff 130 fixed to internal rod 666 for rotation therewith.

Because spring valve 128 and cut-off 130 are not circular in shape but rather are configured to block rebound port 622 and compression port 624 simultaneously, fluid flow is cut off through piston 640, creating an hydraulic lock. See FIG. 7.

Actuation of the rotating cut-off valve 130 is by means of a lever arrangement like that in FIG. 1, with the proviso that the control cable 321 is coupled to the internal rod 666 so as to rotate it. This is accomplished by connecting an arm 134 radially to the top of the internal rod 666, See FIGS. 8 and 9, and coupling the control rod 661 to the outer end of the arm, such that advancing or retracting the control rod by means of lever 30 induces a rotational movement of the internal rod 666.

The foregoing objects are thus achieved, a shock absorber equipped bicycle suspension is locked up by blocking normal operation of the shock absorber, as described by blocking interchamber flow of fluid through a throttling of passages normally used to move fluid from one chamber to another in rebound and compression response of the shock absorber to forces acting on the suspension.

The rider accordingly enjoys the full suspension benefit when that is important, downhill over rough terrain or on smooth surfaces, and can lock out that response when desired as in hill climbing and acceleration.

We claim:

1. Suspension for a human-powered bicycle having a frame and front and rear wheels, comprising a rear wheel-carrying swing arm pivoted on the frame and a shock absorber means acting between said swing arm and said frame, said shock absorber means including a hydraulic shock absorber comprising a cylinder having upper and lower chambers and a piston therebetween having a piston rod and separate compression and extension port means through which fluid flows between the chambers in response respectively to compression and extension of said shock absorber by relative movement between said rear wheel and said frame, and means selectively blocking flow through said compression and extension port means, whereby shock absorber function in said suspension is selectively interruptible.

2. Suspension according to claim 1, in which said blocking means is internally mounted within said shock absorber.

3. Suspension according to claim 2, in which said hydraulic shock absorber includes upper and lower chambers and a piston therebetween through which fluid flows between the chambers in response to extension and compression of said shock absorber, and in which said internally mounted blocking means blocks extension and compression responsive fluid flow between chambers within said shock absorber to interrupt shock absorber function.

4. Suspension according to claim 3, in which said fluid flow between chambers is through port means in said piston, and including a valve normally movable to control opening and closing of said port means, said blocking means blocking movement of said valve in port means closed relation.

5. Suspension according to claim 4, in which said blocking means is bodily shiftable between port means blocking and unblocking positions.

6. Suspension according to claim 5, including also means external to said shock absorber for shifting said blocking means.

7. In combination: a human powered bicycle and the suspension of claim 1.

8. Suspension for a human-powered bicycle having a frame and front and rear wheels, comprising a rear wheel-carrying swing arm pivoted on the frame, a hydraulic shock absorber acting between the swing arm and the frame, said hydraulic shock absorber comprising a cylinder having upper and lower chambers and a piston therebetween having a piston rod and separate compression and extension port means through which fluid flows between the chambers in response to extension and compression of said chock absorber by relative movement between the rear wheel and the frame, and blocking means blocking extension and compression responsive fluid flow through said compression and extension port means to block shock absorber function and interrupt suspension operation.

9. Suspension according to claim 8, in which said blocking means includes flow control means within said shock absorber cylinder and arranged to selectively block flow through said compression and extension ports.

10. Suspension according to claim 9, in which said port means further includes an intermediate port and valve between said compression and extension ports and valves for controlling fluid flow therebetween, and intermediate port valve being bodily shiftable in fluid flow controlling relation, said blocking means acting on said intermediate port valve to prevent bodily shifting thereof, whereby fluid flow between said compression and extension ports is blocked and suspension operation interrupted.

11. Suspension according to claim 9, in which said piston rod includes a relatively movable element selectively in blocking relation to fluid flow between said compression and said extension ports.

12. Suspension according to claim 11, in which said piston port means include first and second ports for compression and extension respectively, and including also first and second port valve means to control compression and extension characteristics of said shock absorber, a third port for fluid flow between said first and second ports at least partially defined by said piston rod movable element, and third valve means selectively blocking fluid flow through said third port responsive to positioning of said piston rod movable element, 13. Suspension according to claim 12, in which said piston rod has a central bore, said rod relatively movable element being journaled in said bore for inward and outward movement with a terminal portion projecting beyond said bore, said third valve means being captured between said piston rod and the end of said movable element terminal portion for movement in third port unblocking relation when said movable element is shifted relatively outward from said bore and against movement in third port blocking relation when said movable element is shifted relatively inward toward said bore.

14. Suspension according to claim 13, including also a spring coil over said shock absorber cylinder arranged to resiliently resist shock absorber compression.

15. Suspension according to claim 13, including also a movable element actuating means comprising an extendible cable coupled to said movable element, and a lever arm for extending said cable in movable element extending relation.

16. In combination: a human powered bicycle and the suspension of claim 11.

17. Suspension according to claim 8, in which said piston rod includes a relatively rotatable element for selectively blocking fluid flow between said compression and said extension ports in suspension operation interrupting relation.

18. Suspension according to claim 17, in which said piston port means include first and second circularly distributed ports for compression and extension respectively, and including also first and second circularly distributed port valve means to control compression and extension characteristics of said shock absorber, third valve means carried rotatably by said piston rod movable element for selectively blocking fluid flow between said first and second valve means said piston rod movable element, 19. Suspension according to claim 18, in which said piston rod has a central bore, said rod relatively movable element being journaled in said bore for axial rotational movement with a terminal portion projecting beyond said bore, said third valve means being carried at the end of said movable element terminal portion for arcuate movement in first and second ports blocking or unblocking relation.

20. Suspension according to claim 19, including also a spring coil over said shock absorber cylinder arranged to resiliently resist shock absorber compression.

21. Suspension according to claim 19, including also a movable element actuating means comprising an actuating arm adapted to drive said movable element arcuately in response to arcuate movement of said arm, an extendible cable coupled to said actuating arm to drive aid arm arcuately in response to cable extension, and a lever arm for extending said cable in movable element extending relation.

22. In combination: a human powered bicycle and the suspension of claim 18.

23. Shock absorber for a human-powered bicycle suspension, said shock absorber comprising a hydraulic shock absorber having upper and lower chambers and a piston therebetween having a piston rod and separate compression and extension port means through which fluid flows between the chambers in response respectively to compression and extension of said shock absorber, and means selectively blocking flow through said compression and extension port means, whereby shock absorber function in said suspension is selectively interruptible.

24. Shock absorber according to claim 23, in which said blocking means is internally mounted within said shock absorber.

25. Shock absorber according to claim 24, in which said fluid flow between chambers is through a normally open port in said piston, said port having a valve, said piston having a rod, and in which said blocking means comprises means journaled in said piston rod and movable relative thereto to lock said port valve to said port in fluid flow blocking relation.

26. Shock absorber according to claim 25, including also means external to said shock absorber for actuating said port valve.

* * * * *